(12) United States Patent
Mazza et al.

(10) Patent No.: US 6,844,406 B2
(45) Date of Patent: Jan. 18, 2005

(54) HIGH FUNCTIONALITY NUMBER, LOW MOLECULAR WEIGHT POLYMERS AND METHODS OF MAKING SAME

(75) Inventors: John H. Mazza, Cheswick, PA (US); Jeffrey Niederst, Pittsburgh, PA (US); Thomas R. Mallen, Zelienople, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 09/971,267

(22) Filed: Oct. 4, 2001

(65) Prior Publication Data

US 2002/0156219 A1 Oct. 24, 2002

Related U.S. Application Data

(60) Provisional application No. 60/237,802, filed on Oct. 4, 2000.

(51) Int. Cl.[7] .................................................. C08F 2/04
(52) U.S. Cl. ................ 526/218.1; 526/223; 526/219.6; 526/320; 526/317.1; 526/329; 526/329.7; 524/555
(58) Field of Search ............................ 526/218.1, 223, 526/219.6, 320, 317.1, 329, 329.7, 328, 307, 307.1, 303.1, 319, 318.44; 524/555; 525/28; 523/407; 528/103

(56) References Cited

U.S. PATENT DOCUMENTS

| | | | |
|---|---|---|---|
| 3,026,281 A | | 3/1962 | Harren et al. |
| 3,541,045 A | | 11/1970 | Jabloner |
| 3,784,396 A | | 1/1974 | Fourment et al. |
| 4,075,242 A | | 2/1978 | Rhum et al. |
| 4,164,488 A | * | 8/1979 | Gregorovich et al. ....... 524/512 |
| 4,276,432 A | | 6/1981 | Rhum et al. |
| 4,857,622 A | | 8/1989 | Bousquet et al. |
| 4,960,522 A | * | 10/1990 | Amjad et al. ................ 210/701 |
| 4,963,602 A | * | 10/1990 | Patel ........................... 523/403 |
| 5,545,348 A | * | 8/1996 | Savio .......................... 510/230 |

FOREIGN PATENT DOCUMENTS

| | | |
|---|---|---|
| AU | 200071927 A1 | 5/2001 |
| CA | 2163331 | 5/1996 |
| DE | 864 151 | 1/1953 |
| DE | 1 769 695 | 4/1971 |
| EP | 0 157 133 A1 | 10/1985 |
| EP | 0 342 976 A1 | 11/1989 |
| EP | 0 758 007 A2 | 2/1997 |
| EP | 0 826 710 A2 | 3/1998 |
| GB | 1 480 368 | 7/1977 |
| GB | 1 489 485 | 10/1977 |
| GB | 1 555 995 | 11/1979 |
| GB | 1 599 382 | 9/1981 |
| JP | 51-132295 | 11/1976 |
| JP | 56-104905 | 8/1981 |
| JP | 2-51531 | 2/1990 |
| WO | WO 94/12570 | 6/1994 |
| WO | WO 97/31059 | 8/1997 |

OTHER PUBLICATIONS

"Binders for paints and varnishes—Determination of acid value—Titrimetric method," *International Standard*, Zuerich, CH, 1996, pp. 1–3, XP–000892989.

* cited by examiner

*Primary Examiner*—Tatyana Zalukaeva
(74) *Attorney, Agent, or Firm*—Fish & Richardson P.C., P.A.

(57) ABSTRACT

The present invention provides novel low molecular weight, high functionality number, polymers. The polymers may be made, for example, by heating (preferably, to a temperature of between about 130° C. and 180° C.) one or more ethylenically unsaturated monomers in the presence of a substantially aprotic solvent system; and maintaining the temperature for a time sufficient to polymerize the monomers to a preferred monomer to polymer conversion percentage of at least about 95 percent by weight. In a presently preferred embodiment, the polymer has a weight average molecular weight between about 900 and 7,000 Dalton and a functionality number of at least 100. The process is also preferably substantially free of chain transfer agents.

16 Claims, No Drawings

HIGH FUNCTIONALITY NUMBER, LOW MOLECULAR WEIGHT POLYMERS AND METHODS OF MAKING SAME

RELATED APPLICATION

This application claims priority from U.S. Provisional Application Ser. No. 60/237,802 filed Oct. 4, 2000. Of related interest is PCT Patent Application Serial No. PCT/US01/21748, filed on 11 Jul. 2001 which is herein incorporated by reference.

BACKGROUND

The search for new polymers and new methods of making polymers has been long and difficult. Even before this search is begun, however, the formulator must make an initial assessment of what type of polymer will optimally work to meet his or her requirements. Once those basic requirements are "identified" and a potential polymer is "envisioned" that might work to meet the basic requirements, the next task of actually making that polymer begins. In some cases the synthesis of the polymer is complicated by side reactions that occur during the synthesis process. In other cases the task is complicated by the many variables that can affect the sought after properties. For example, in many instances achieving one or more property, such as molecular weight or polydispersity, may be difficult to achieve using traditional preparation methods or conditions. Consequently, the formulator, even if he or she has a target polymer for the desired formulation, may not be able to synthesize a target polymer that has all the desired properties.

Formulators in the packaging coatings field, for example, have long sought improved coatings that can be used as a clear protective coating applied to protect the exterior paint coat of a can from smearing, marring, or degradation. One goal is to develop coating compositions that are ready for immediate use without additional preparation steps (i.e., that are "one-stage"). Preferred compositions of interest are stable in bulk quantities at standard temperature and pressure so that they may be efficiently and cost effectively shipped and stored without gellation or degradation prior to use. They also preferably are able to withstand the conditions of processing. When applied to substrates, the compositions must cure and dry rapidly (i.e., possess "snap cure" capabilities), have good adhesion to metal and other materials, be scratch resistant, and have a clear and glossy appearance.

Certain prior art coating compositions that meet these requirements are variants of formulations employed traditionally in the packaging coatings industry, including phenol/formaldehyde, urea/formaldehyde, and melamine/formaldehyde formulations. However, the widespread use of formaldehyde in production scale applications is falling into disfavor because of perceived environmental and health considerations. The unfavorable aspects of formaldehyde have spurred researchers to develop new coating formulations that contain formaldehyde scavengers. Unfortunately, such coatings have many shortcomings. For example, resins containing formaldehyde scavengers such as melamine, urea, or ammonia, frequently have low water tolerance and require the need for stabilizing emulsifiers. Rogue formaldehyde emissions, as well as additional, stability-related problems associated with heating and curing operations, also pose complications. As a result, there is a need in the packaging coatings industry for substantially formaldehyde-free hardenable compositions that are easy to use and exhibit favorable crosslinking and coating characteristics. In particular, there is a need to develop coating compositions and formulations that are stable at standard temperature and pressure so that they can be transported and stored in bulk prior to use in production scale operations. There is also a need for coating compositions and formulations that have stability and curing profiles that comport with production scale applications and are snap-curable, that adhere to substrates such as metal, that have a clear, glossy appearance, and that are mar resistant.

The above needs for the aforementioned improved coating compositions have not been met with existing commercially made polymers. The polymer compositions of the present invention may be successfully manufactured using the methods described herein and employed to solve these and other problems.

SUMMARY

In one embodiment, this invention relates to novel low molecular weight, high functionality number, polymers. The polymers may be made, for example, by heating (preferably, to a temperature of between about 130° C. and 180° C.) one or more ethylenically unsaturated monomers in the presence of a substantially aprotic solvent system; and maintaining the temperature for a time sufficient to polymerize the monomers to a preferred monomer to polymer conversion percentage of at least about 95 percent by weight. In a presently preferred embodiment, the polymer has a weight average molecular weight between about 900 and 7,000 Dalton and a functionality number of at least 100. The process is also preferably substantially free of chain transfer agents (e.g., mercaptans, alcohols, etc.).

DEFINITIONS

By "functionality number" is meant the combined acid functionality (also called "acid number" or "AN") and hydroxyl functionality (also called "hydroxyl number") of a polymer.

An "aprotic solvent" is a type of solvent that contains no hydrogen atoms bonded directly to electronegative atoms such as N, O or S. Generally; an aprotic solvent is one that does not donate protons.

The term "substantially aprotic solvent system" means that the solvent system of the present invention (which may include mixtures of solvents, most typically aprotic solvents) is contaminated with no more protic solvent than would cause undesirable amounts of esterification in the process of the present invention. The term "essentially aprotic solvent system" means that the solvent system is contaminated with no more than about 10 percent by weight of a protic solvent. The term "essentially completely aprotic solvent system" means that the solvent system is contaminated with no more than about 5 percent by weight of a protic solvent. The term "completely aprotic solvent system" means that the solvent system is contaminated with no more than about 1 percent by weight of a protic solvent.

The terms "substantially mercaptan-free" and "substantially free of mercaptan" mean that the compositions of the present invention are contaminated with no more than about 0.2 percent by weight mercaptan. The term "essentially mercaptan-free" means that the compositions of the present invention are contaminated with no more than about 0.1 percent by weight mercaptan. The term "essentially completely mercaptan-free" means that the compositions of the present invention are contaminated with no more than about 0.025 percent by weight mercaptan. The term "completely mercaptan-free" means that the compositions of the present invention are contaminated with less than 5 parts per million (ppm) mercaptan.

DETAILED DESCRIPTION

The present invention provides high functionality number, low molecular weight polymers and compositions (e.g., coating compositions) made with the polymers. The invention, in preferred embodiments, solves one or more of the unmet needs noted above.

In one embodiment, the present invention relates to high functionality number, low molecular weight polymers. These polymers have wide utility, including use in high performance coating compositions. In one preferred embodiment, the polymers are used in hardenable, substantially formaldehyde-free coating compositions. U.S. Patent Application No. 60/218,592, which is herein incorporated by reference, describes such preferred compositions.

The high functionality number, low molecular weight polymers are preferably prepared by heating to a temperature of between about 130° C. and 180° C. one or more ethylenically unsaturated monomers in the presence of a substantially aprotic solvent system; and maintaining the temperature for a time sufficient to polymerize the monomers to a monomer to preferred polymer conversion percentage of at least about 95 percent by weight. Preferred high functionality number, low molecular weight polymers of the present invention have a weight average molecular weight between about 900 and 7,000 Dalton and an average functionality number of at least 100. In preferred embodiments, the process of the present invention is substantially free of chain transfer agents (e.g., mercaptans, alcohols, etc.).

Suitable high functionality number polymers of the present invention have an average functionality number greater than or equal to 100. By "functionality number" is meant the combined acid functionality (also called "acid number" or "AN") and hydroxyl functionality (also called "hydroxyl number") of the polymer.

Suitable high functionality number polymers of the present invention include polyacids, polyanhydrides, salts thereof, or mixtures thereof having an acid number greater than about 100; polyhydroxyls having a hydroxyl number greater than 100; and mixed functionality polymers having both acid and hydroxy functionality having a combined acid number and the hydroxyl number greater than about 100. Suitable high functionality number polymers would include, for example, (i) polymers having an acid number of 101, (ii) polymers having a hydroxyl number of 101, (iii) mixed polymers having an acid number of 50 and a hydroxyl number of 51; mixed polymers having an acid number of 51 and a hydroxyl number of 50; etc.

Preferred polymers have a functionality number (i.e., the sum of the acid number and the hydroxyl number) in the range of from about 100 to 800, more preferably from about 200 to 700, and most preferably from about 300 to 600.

The acid number (as used in reference to the present compositions) is the number of milligrams of potassium hydroxide required to neutralize one gram of the solid polyacid polymer. The acid number of an anhydride-containing polymer is determined by initially hydrolyzing the anhydride-containing polymer to obtain the corresponding polyacid polymer. The acid number is then determined in the same manner as for a polyacid polymer. The acid number of a salt compound may be determined as the number for a like acid compound that has not been converted to the salt.

The hydroxyl number of a hydroxyl-containing polymer of the present invention is determined by: (i) esterifying the polymer with acetic anhydride and pyridine to obtain an esterified polymer and acetic acid; and (ii) then neutralizing the acetic acid with potassium hydroxide. The units are expressed similarly to acid number, i.e., the number of milligrams of potassium hydroxide required to neutralize the acetic acid formed as described above per one gram of hydroxyl-containing polymer.

A high acid number is generally preferred for use in certain preferred hardenable, substantially formaldehyde-free coating compositions. While not intending to be bound by theory, it is believed that the acid number in this embodiment should be high enough to facilitate the formation or reformation of a sufficient amount of anhydride during cure. Anhydride formation (which may be intermolecular and/or intramolecular) is believed to be an integral part of the curing mechanism. Consequently, polyacids having a low acid number are believed to be less efficient in the formation or reformation of anhydride (e.g., due to the greater separation between acid groups) and are thus less efficient in the curing process.

In cases of mixed functionality polymers (i.e., polymers having both acid functionality and hydroxyl functionality) care should be taken to prevent undesirable gellation of the polymer as a result of the combined functionality being too high. For example, high functionality polymers can exist without undesirable gellation when the functionality is due to either a high acid number or a high hydroxyl number. However, when a polymer is formed having both high acid number and high hydroxyl number care must be taken to avoid any undesirable gellation. For example, it is presently believed that mixed polymers should have less than about 120 acid number when the hydroxyl number is greater than 120; and less than 120 hydroxyl number when the acid number is greater than 120. By limiting the total available "crosslinkable sites" of the mixed polymer below a preferred threshold, the polymer is less likely to undesirably gel prior to hardening on the substrate.

Subject to the above comments regarding mixed polymers, preferred acidic polymers have an acid number greater than 100, more preferably greater than about 240, most preferably between about 320 and 600, and optimally between about 350 and 550. Also subject to the above, preferred hydroxyl functional polymers have a hydroxyl number greater than 100, more preferably greater than about 240, most preferably between about 320 and 600, and optimally between about 350 and 550.

Suitable high functionality number polymers of the present invention include polymers having a variety of molecular weights, depending on the final use application of the composition. For coating applications the molecular weight should be selected such that the final composition has the desired coating properties as well as the desired cured physical properties. For example, when the composition is used in a spray application the molecular weight should be tailored to avoid veiling. When used in a roll coating operation the molecular weight should be tailored to avoid misting and/or to optimize effective open time.

Suitable polymers of the present invention have a weight average molecular weight range between about 450 and 7,000 Daltons. A preferred weight average molecular weight range for the polymers of the present invention is between about 900 and 7,000 Daltons, more preferably between about 1,500 and 5,000 Daltons, and most preferably between about 2,000 and 3,000 Daltons. A preferred number average molecular weight range for the polymers of the present invention is between about 450 and 4,000 Daltons, more preferably between about 600 and 3,000 Daltons, and most preferably between about 1,000 and 2,500 Daltons.

Preferred polyfunctional polymers include homopolymers or copolymers prepared from ethylenically unsaturated acid-, anhydride-, or hydroxyl-functional monomers and other optional monomers. In other words, acid-, anhydride-, or hydroxyl-functional monomers may be polymerized alone, together, or with one or more additional vinyl monomers to form the high functionality polymers of the present invention. Low molecular weight polymers are preferred for certain applications, as is discussed herein.

Ethylenically unsaturated monomers suitable for the present invention include compounds having typically from about 3 to about 20 carbons, 1 to 4 sites of unsaturation, and from 1 to 5 functional groups (e.g., acid, anhydride, hydroxyl groups, or salts of the acids or anhydrides).

Non-limiting examples of useful ethylenically unsaturated acid monomers include acids such as, for example, acrylic acid, methacrylic acid, crotonic acid, fumaric acid, maleic acid, cinnamic acid, 2-methyl maleic acid, itaconic acid, 2-methyl itaconic acid, α, β-methyleneglutaric acid, and the like or mixtures thereof. Preferred unsaturated acid monomers include acrylic acid, methacrylic acid, crotonic acid, fumaric acid, maleic acid, 2-methyl maleic acid, itaconic acid, 2-methyl itaconic acid and mixtures thereof. More preferred unsaturated acid monomers include acrylic acid, methacrylic acid, crotonic acid, fumaric acid, maleic acid, itaconic acid, and mixtures thereof. Most preferred unsaturated acid monomers include acrylic acid, methacrylic acid, maleic acid, crotonic acid, and mixtures thereof.

Non-limiting examples of suitable ethylenically unsaturated anhydride monomers include compounds derived from the above acids (e.g., as pure anhydride or mixtures of such). Preferred anhydrides include acrylic anhydride, methacrylic anhydride, and maleic anhydride.

Non-limiting examples of suitable ethylenically unsaturated hydroxyl-functional monomers include hydroxyethyl acrylate (HEA), hydroxyethyl methacrylate (HEMA), hydroxypropyl acrylate, hydroxypropyl methacrylate, and ethoxylated or propoxylated versions of the aforementioned monomers and mixtures of such monomers.

Suitable co-monomers for polymerization with the ethylenically unsaturated carboxylic acid or ethylenically unsaturated anhydride monomers include vinyl monomers such as styrene, α-methyl styrene, acrylonitrile, methacrylonitrile, methyl acrylate, ethyl acrylate, ethylhexyl acrylate, hydroxyethyl acrylate, hydroxypropyl acrylate, isobutyl acrylate, glycidyl acrylate, methyl methacrylate, ethyl methacrylate, ethylhexyl methacrylate, n-butyl methacrylate, hydroxyethyl methacrylate, hydroxypropyl methacrylate, isobutyl methacrylate, glycidyl methacrylate, vinyl methyl ether, vinyl acetate, and combinations. Preferred vinyl monomers are styrene, α-methyl styrene, and ethylhexyl acrylate.

The ratio of monomers generally will be selected to achieve the desired functionality number of the polymer. The present invention provides improved process whereby undesirable esterification of acid functionality can be avoided. Consequently, the actual acid number of the polymer will more closely approach the "theoretical acid number." In preferred processes less than 20 percent of the acidic functionality of the monomers is lost via esterification during the formation of the polymer. In more preferred processes less than 10 percent of the acidic functionality is lost via esterification.

In preferred embodiments the monomers are reacted in the presence of a substantially aprotic solvent system, more preferably in the presence of an essentially aprotic solvent system, most preferably in the presence of an essentially completely aprotic solvent system, and optimally in the presence of a completely aprotic solvent system. It has surprisingly been discovered that the use of an aprotic solvent system facilitates the formation of high functionality number polymers, while minimizing undesirable esterification of any acidic functionality. In contrast, certain prior art processes have generally utilized protic solvents. For example, benzyl alcohol or isopropanol are often used as the primary solvent, in part because they can also function as a chain transfer agent. Unfortunately, it has been discovered that high acid number polymers are prone to large esterification side reactions (30% esterification or more) in such solvents.

The choice of aprotic solvent will depend on a variety of factors, including cost, boiling point, solubility parameter for the desired polymer, etc.

Examples of suitable aprotic solvents include solvents having the general structure:

where

R is: $CH_3$ or H; and

R' is any of the various saturated alkyl groups (e.g., methyl, ethyl, propyl, isopropyl, butyl, t-butyl, sec-butyl, etc.); and n is 0 to about 4.

Suitable such solvents include diglyme, and ethyl diglyme.

Other suitable aprotic solvents include 2-butoxy ethyl acetate; 2-methoxy propyl acetate; acetamide; acetone; benzene; butyl acetate; butyl adipate; chlorobenzene; 1,3 dichlorobenzene; diethyl ether; diisopropyl ether; dimethyl formamide; dimethyl sulfoxide; 1,4 dioxane; dipropyl ether; ethyl acetate; ethylene carbonate; methyl adipate; methyl ethyl ketone; methylformamide; methyl isobutyl ketone; propyl acetate; propylene carbonate; tetrahydrofuran; toluene; trimethyl benzene; and xylene.

In preferred embodiments the monomers are reacted in the presence of a suitable initiator system. The choice of initiator will depend on a variety of factors, including the desired reaction temperature and pressure. Preferred initiators are somewhat more stable ones (i.e., those having a lower-energy free radical). Suitable initiators for use in the present process include peroxides, persulfates, and di-azos (e.g., VAZO 52—2,2'-azobis(2,4-demethylpentanenitrile), VAZO 64—2,2'-azobis(2-methylpropanenitrile), VAZO 67—2,2'-azobis(2,4-methylbutanenitrile), and VAZO 88—1,1'-azobis(cylcolhexanecarbonitrile)).

Suitable peroxides for use in this process include diacyl peroxides, alkyl peresters, alkyl hydroperoxides, and dialkyl peroxides. Examples of suitable peroxides include tert. amylperoxy 2-ethylhexanoate, tert. butylperoxy 2-ethylhexanoate, tert. butylperoxy isobutyrate, tert.butyhnonoperoxy maleate, tert. butylperoxy acetate, tert. amylperoxyacetate, acetyl cyclohexane sulphonyl peroxide, di(2,4-dichloro benzoyl)peroxide, di(3,5,5-trimethyl hexanoyl)peroxide, didecanoyl peroxide, dilauroyl peroxide, disuccinic acid peroxide, di(4-methylbenzoyl) peroxide, dibenzoyl Peroxide, dicumyl peroxide, tert.butyl-cumyl peroxide, di(tert.amyl)peroxide, 1,3-Di(2-tert.butylperoxy isopropyl)benzene, di(2-tert.butylperoxy isopropyl)benzene, 2,5-Dimethyl 2,5-di(tert.butylperoxy) hexane, di(tert.butyl)peroxide, tertiary butyl peroctoate, tertiary butyl perbenzoate, tertiary butyl hydroperoxide, and cumyl hydroperoxide. Preferred peroxides for use in this process include dicumyl peroxide, di-tertiary butyl peroxide, and di-tertiary amyl peroxide or mixture of such peroxides.

Preferred reaction temperatures for preparing the polymers of the present invention are between about 110° C. and 200° C., more preferably between 130° C. and 180° C., and most preferably between 150° C. and 170° C. In general, at higher temperatures than these the resultant polymer will have a substantial fraction of low molecular weight component and the polydispersity will be high. In addition, the percent conversion of monomer to polymer (discussed below) will be relatively low. In contrast, at lower temperatures the polymer's molecular weight will be on average high (i.e., greater than 7000 Dalton).

The monomers are preferably reacted for a time sufficient to polymerize the monomers to a monomer to polymer conversion percentage of at least about 95 percent by weight, more preferably to a conversion percentage of at least about 98 percent, most preferably to a conversion percentage of at least about 99, and optimally to a conversion percentage of at least about 99.5 percent.

In one preferred embodiment the reaction is conducted at ambient pressure. Ambient pressure is often preferred because the equipment costs can be minimized. In contrast, processes that are conducted using isopropanol solvent often must be conducted at elevated pressure to avoid loss of the low boiling solvent at the desired reaction temperature.

In preferred embodiments the monomers are reacted in an environment that is substantially mercaptan-free, more preferably in an environment that is essentially mercaptan-free, most preferably in an environment that is essentially completely mercaptan-free, and optimally in an environment that is completely mercaptan-free. Mercaptans have long been used as chain transfer agents. Conventional wisdom has favored the use of mercaptan chain transfer agents despite their problems with offensive smell and tendency to cause discoloration. Mercaptans have been tolerated, because conventional wisdom thought that without such a chain transfer agent the reaction process would require elevated temperatures, and those elevated temperatures were believed to contribute to other undesirable problems (such as increased esterification side reactions). It has surprisingly been discovered that systems that are substantially free of mercaptan chain transfer agents can be successfully processed in a substantially aprotic solvent system while avoiding undesirable esterification side reactions.

The following examples are offered to aid in understanding of the present invention and are not to be construed as limiting the scope thereof. Unless otherwise indicated, all parts and percentages are by weight.

EXAMPLES

Example 1

Preparation of Polyacid Compounds

Run 1: Preparation of Polyacid Compound I

A reaction flask equipped with a stirrer, condenser tube, and inert gas inlet is charged with 57.2 g of diethylene glycol dimethyl ether, (diglyme). A sparge of Nitrogen is begun, and some light agitation of the reaction flask initiated. The temperature of the flask is set for 170° C. In a separate vessel, methacrylic acid, 132.5 g (1.54 mol), 2-ethylhexyl acrylate, 66.2 g (0.36 mol), styrene, 22.1 g (0.21 mol), and dicumyl peroxide, 15.5 g (0.06 mol) is mixed. The mixture is gently stirred until the dicumyl peroxide dissolves. Once the diglyme has reached 170° C., the temperature set point is reduced to 162° C. The addition of the monomer/initiator mixture is started. The initiator/monomer mixture is added over a period of about 180 minutes. After the addition is complete, the temperature of the reaction flask is maintained for an additional 120 minutes to complete the polymerization process. A temperature range of 160–170° C. is maintained throughout the reaction time. Following the 120 minute holding time, the reaction flask is set for 100° C. Once the reaction has cooled to 100° C., benzoyl peroxide, 2.0 g (0.008 mol) is added. The reaction contents are maintained at 100° C. for an additional 60 minutes. After the 60-minute hold time, the reaction flask is set for a temperature of 90° C. A mixture of dimethyl ethanolamine, 48.0 g (0.54 mol) and deionized water 96.0 g is added to the reaction flask, over 10 minutes. The reaction temperature is maintained at 90° C. for 60 minutes. Following this 60-minute hold, the reaction flask is set for 80° C., and 331.0 g of deionized water is added, over a 60-minute period. Once the water addition is complete, the reaction flask is allowed to cool, under gentle agitation, to room temperature (~25° C.). The polyacid compound can be discharged and characterized for solution/chemical properties.

The polyacid compound yielded the following characteristics:

| | |
|---|---|
| Molecular Mass (MW) by Gel Permeation Chromatography | 2,630 Daltons |
| Solids Content (30 minutes at 160° C.) | 34.3% by Weight |
| Acid number (Titration with methanolic KOH) | 346.0 mg KOH/g |

Run 2: Preparation of Polyacid Compound II

The polyacid was prepared according to the procedure of Ex. 1, Run 1, except diglyme is replaced with diethylene glycol diethyl ether (ethyl diglyme) as the solvent during polymerization.

Run 3: Preparation of Polyacid Compound III

The polyacid was prepared according to the procedure of Ex. 1, Run 1, except diglyme is replaced with Ektapro EEP as the solvent during polymerization.

Run 8: Preparation of Polyacid Compound VIII

The polyacid was prepared according to the procedure of Ex. 1, Run 1, except the resulting polyacid compound is not diluted by addition of dimethyl ethanolamine and deionized water.

Run 9: Preparation of Polyacid Compound IX

The polyacid was prepared according to the procedure of Ex. 1, Run 8, except the diglyme is replaced with ethyl diglyme.

Run 10: Preparation of Polyacid Compound X

A reaction flask equipped with a stirrer, condenser tube, and inert gas inlet is charged with 55.9 g of diethylene glycol dimethyl ether, (diglyme). A sparge of Nitrogen is begun, and some light agitation of the reaction flask initiated. The temperature of the flask is set for 170° C. In a separate vessel, methacrylic acid, 158.6 g (1.84 mol), 2-ethylhexyl acrylate, 42.5 g (0.23 mol), styrene, 14.2 g (0.14 mol), and dicumyl peroxide, 15.5 g (0.06 mol) is mixed. The mixture is gently stirred until the dicumyl peroxide dissolves. Once the diglyme has reached 170° C., the temperature set point is reduced to 162° C. The addition of the monomer/initiator mixture is started. The initiator/monomer mixture is added over a period of about 180 minutes. After the addition is complete, the temperature of the reaction flask is maintained for an additional 120 minutes to complete the polymerization process. A temperature range of 160–170° C. is maintained throughout the reaction time. Following the 120 minute holding time, the reaction flask is set for 100° C. Once the reaction has cooled to 100° C., benzoyl peroxide, 2.0 g (0.008 mol) is added. The reaction contents are maintained at 100° C. for an additional 60 minutes. After the 60-minute hold time, the reaction flask is cooled and discharged. The polyacid compound can be discharged and characterized for solution/chemical properties.

The polyacid compound yielded the following characteristics:

| | |
|---|---|
| Molecular Mass (MW) by Gel Permeation Chromatography | 2810 Daltons |
| Solids Content (30 minutes at 160° C.) | 83.4% by Weight |
| Acid number (Titration with methanolic KOH) | 425 mg KOH/g |

Example 2

Run 1: Preparation of Mixed Polyacid/Polyhydroxyl Compound I

A reaction flask equipped with a stirrer, condenser tube, and inert gas inlet was charged with 57.8 g of butylcellosolve (ethylene glycol monobutylether). A sparge of Nitrogen was begun, and some light agitation of the reaction flask initiated. The temperature of the flask was set for 155° C. In a separate vessel was mixed: 2-hydroxy ethyl acrylate (110 g; 0.95 mol ), butyl acrylate (82.4 g; 0.64 mol ), acrylic acid (28.4 g; 0.39 mol), and dicumyl peroxide (15.5 g; 0.06 mol). The mixture was gently stirred until the dicumyl peroxide dissolved. Once the butylcellosolve reached 155° C., the addition of the monomer/initiator premix was started. The initiator/monomer mixture was added over a period of about 180 minutes. After the addition was complete, the temperature of the reaction flask was maintained for an additional 60 minutes to complete the polymerization process. A temperature range of 150–160° C. was maintained throughout the reaction time. Following the 60 minute holding time, the reaction flask was set for 100° C. Once the reaction has cooled to 100° C., a mixture of dimethyl ethanolamine (24.6 g; 0.28 mol), and deionized water (24.6 g) was added over 10 minutes. Following this 10 minute addition, the reaction flask was allowed to cool to room temperature (~25° C.), under gentle agitation, during the final addition of deionized water (384.3 g). The polyacid/polyhydroxyl copolymer compound was discharged and characterized for solution/chemical properties.

The polyacid/polyhydroxyl compound yielded the following characteristics:

Molecular Mass (Mw) by Gel Permeation Chromatography—3,701 Daltons
Solids Content (30 minutes at 160 C.)—31.8% by Weight
Acid number (Titration with methanolic KOH)—75.2 mg KOH/g Example 3

Comparative Run 1: Preparation of Polyacid Compound in a Protic Solvent

A reaction flask equipped with a stirrer, condenser tube, and inert gas inlet was charged with 201.2 g of butylcellosolve (ethylene glycol monobutylether). A sparge of Nitrogen was begun, and some light agitation of the reaction flask initiated. The temperature of the flask was set for 170° C. In a separate vessel, styrene (58.1 g; 0.56 mol), methacrylic acid (329.4 g; 3.83 mol), and dicumyl peroxide (27.2 g; 0.10 mol), was mixed. The mixture was gently stirred until the dicumyl peroxide dissolves. Once the butylcellosolve has reached 170° C., the addition of the monomer/initiator premix was started. The initiator/monomer mixture was added over a period of about 180 minutes. After the addition was complete, the temperature of the reaction flask was maintained for an additional 120 minutes to complete the polymerization process. A temperature range of 165–175° C. was maintained throughout the reaction time. Following the 120 minute holding time, the reaction flask was set for 100° C. Once the reaction cooled to 100 C., a mixture of dimethyl ethanolamine (102.2 g; 1.15 mol), and deionized water (318.6 g) was added over 40 minutes. Following this 40-minute addition, the reaction flask was allowed to cool to room temperature (~25° C.), under gentle agitation. The polyacid compound was discharged and characterized for solution/chemical properties.

The polyacid compound yielded the following characteristics:

Molecular Mass (Mw) by Gel Permeation Chromatography—3,260 Daltons
Solids Content (30 minutes at 160° C.)—35.6% by Weight
Acid number (Titration with methanolic KOH)—447.6 mg KOH/g Run 2: Preparation of Polyacid Compound in an Aprotic Solvent The polyacid was prepared according to the procedure of Ex. 3, Comparative Run 1, except butylcellosolve is replaced with diethylene glycol diethyl ether (ethyl diglyme) as the solvent during polymerization.

The polyacid compound yielded the following characteristics:

Molecular Mass (Mw) by Gel Permeation Chromatography—2,630 Daltons
Solids Content (30 minutes at 160° C.)—36.1% by Weight
Acid number (Titration with methanolic KOH)—500.3 mg KOH/g Example 4

Results of Analysis and Testing

Table 4A illustrates the calculated weight average molecular weight (Mw), number average molecular weight (Mn), polydispersity (PD), and percent non-volatiles (% NV) for various polymers prepared as described above.

TABLE 4A

| Patent ID | Mw | Mn | PD | % NV |
|---|---|---|---|---|
| Ex. 1 Run 1 | 2,630 | 1,220 | 2.2 | 34.3 |
| Ex. 1 Run 2 | 2,046 | 493 | 4.2 | 32.34 |
| Ex. 1 Run 3 | 2,091 | 526 | 4 | 32.28 |
| Ex. 1 Run 8 | 2,470 | 1,190 | 2.1 | 32.07 |
| Ex. 1 Run 10 | 2,810 | 1,260 | 2.2 | 83.4 |
| Ex. 2 Run 1 | 3,701 | 1,382 | 2.7 | 31.8 |
| Ex. 3 Run 2 | 2,630 | 1,090 | 2.4 | 36.1 |
| Ex. 3 Run 1 | 3,260 | 1,410 | 2.3 | 35.6 |

Table 4B illustrates the calculated acid number, the theoretical acid number (Theo AN), the hydroxyl number for various polymers prepared as described above. In addition, the quantity of extracted species (2-ethylhexylacrylate, styrene and methacrylic acid) from certain wet samples of the various polymers was measured. The "% free monomer" may be determined using a gas chromatograph equipped with a flame ionization detector (FID) against known standards of the same monomers.

TABLE 4B

| Patent ID | Acid No. | Theo AN | Hydro No. | % Free Monomer | | |
|---|---|---|---|---|---|---|
| | | | | 2-EHA | STY | MAA |
| Ex. 1 Run 1 | 346 | 365 | 0 | | | |
| Ex. 1 Run 2 | 353.4 | 365 | 0 | 600 ppm | 200 ppm | 400,00 ppm |
| Ex. 1 Run 3 | 348.6 | 365 | 0 | 300 ppm | 200 ppm | 30,000 ppm |
| Ex. 1 Run 8 | 446.4 | 480 | 0 | 1,900 ppm | <100 ppm | ND |
| Ex. 1 Run 10 | 425 | 448 | 0 | | | |
| Ex. 2 Run 1 | 75.2 | 100 | 240 | | | |
| Ex. 3 Run 2 | 500.3 | 517.5 | 0 | | | |
| Ex. 3 Run 1 | 447.6 | 517.5 | 0 | | | |

2-EHA = 2 Ethyl Hexyl Acrylate
STY = Styrene
MAA = Methacrylic acid

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A process for preparing low molecular weight, high functionality number polymers, comprising:
    heating to a temperature between 130° C. and 180° C. a mixture comprising:
    one or more ethylenically unsaturated monomers;
    an initiator system comprising a compound selected from the group consisting of persulfates, peroxides, di-azos, and combinations thereof; and
    a substantially aprotic solvent system, and
    maintaining the temperature of the mixture for a time sufficient to polymerize the monomers to a monomer to polymer conversion percentage of at least about 95 percent by weight,
    wherein the polymer has a weight average molecular weight between about 900 and 7,000 Dalton, a hydroxyl number of at least 240 and an acid number of greater about 240.

2. The process of claim 1, wherein the process is substantially free of chain transfer agents.

3. The process of claim 1, wherein the process is substantially free of mercaptan chain transfer agents.

4. The process of claim 1, wherein the polymer has an acid number between 320 and 600.

5. The process of claim 1, wherein the polymer has an acid number between 320 and 600 and a weight average molecular weight between about 1,500 and 5,000 Dalton.

6. The process of claim 1, wherein the polymer has a weight average molecular weight between about 1,500 and 5,000 Dalton.

7. The process of claim 1, wherein the polymer has a number average molecular weight between about 1,000 and 2,500 Dalton.

8. The process of claim 1, wherein the process comprises maintaining the temperature for a time sufficient to polymerize the monomers to a monomer to polymer conversion percentage of at least about 99 percent by weight.

9. The process of claim 1, wherein the process comprises maintaining the temperature for a time sufficient to polymerize the monomers to a monomer to polymer conversion percentage of at least about 99.5 percent by weight.

10. The process of claim 3, wherein the process is essentially completely mercaptan-free.

11. The process of claim 1, wherein the process comprises eating the monomers in the presence of an essentially completely aprotic solvent system.

12. The process of claim 1, wherein the monomers include acidic- or anhydride-functional monomer selected from the group of acrylic acid, methacrylic acid, crotonic acid, fumaric acid, maleic acid, cinnamic acid, 2-methyl maleic acid, itaconic acid, 2-methyl itaconic acid, α,β-methyleneglutaric acid, anhydrides of the aforementioned acids, and mixtures thereof.

13. The process of claim 9, wherein the process results in less than 20% of the acidic functionality being lost to esterification side reactions.

14. A polymer prepared by the process of claim 1.

15. A coating composition, comprising: a polymer prepared by the process of claim 1.

16. A coating composition, comprising: a low molecular weight, high acid number polymer, wherein the polymer has a weight average molecular weight between about 900 and 7,000 Dalton a hydroxyl number of at least 240 and an acid number of greater than about 240.

* * * * *